United States Patent

[11] 3,630,312

| [72] | Inventors | James R. Woodward |
| | | El Cajon, Calif.; |
| | | Billy G. Cook, Booneville, Ark. |
| [21] | Appl. No. | 874,904 |
| [22] | Filed | Nov. 7, 1969 |
| [45] | Patented | Dec. 28, 1971 |
| [73] | Assignee | Rohr Corporation |
| | | San Diego, Calif. |

[54] SOUND ABSORPTIVE HONEYCOMB SANDWICH PANEL WITH MULTILAYER, POROUS, STRUCTURAL FACING
3 Claims, 4 Drawing Figs.

[52] U.S. Cl. ..................................... 181/33, 181/42
[51] Int. Cl. ..................................... E04b 1/84
[50] Field of Search ........................... 181/33, 33.1, 33.11, 42, 50, 71

[56] References Cited
UNITED STATES PATENTS

| 1,833,143 | 11/1931 | Weiss | 181/33 (.1) |
| 2,271,929 | 2/1942 | Venzie | 181/33 (.1) |
| 2,361,652 | 10/1944 | Radabaugh et al. | 181/33 (.1) |
| 2,966,954 | 1/1961 | Sabine | 181/33 (.1) |
| 3,011,584 | 12/1961 | Lemmerman et al. | 181/33 (.1) |
| 3,103,987 | 9/1963 | Gildard et al. | 181/33 (.1) |
| 3,166,149 | 1/1965 | Hulse et al. | 181/33 (.1) |
| 3,481,427 | 12/1969 | Dobbs et al. | 181/33 |
| 3,502,171 | 3/1970 | Cowan | 181/33 |
| 3,507,355 | 4/1970 | Lawson | 181/42 X |

*Primary Examiner*—Robert S. Ward, Jr.
*Attorney*—George E. Pearson

ABSTRACT: A sound absorptive honeycomb sandwich panel has a honeycomb core and a light sheet metal backing applied to one end thereof, and has also a porous facing comprising a plurality of layers of foraminous material of substantial structural strength with the layers arranged in random, closely superposed relation, applied to the other end thereof. The multilayer facing, the backing and the core are all integrally interconnected to form the sandwich panel.

3,630,312

*INVENTOR.*
JAMES R. WOODWARD
BY BILLY G. COOK

ATTORNEY

SOUND ABSORPTIVE HONEYCOMB SANDWICH PANEL WITH MULTILAYER, POROUS, STRUCTURAL FACING

BACKGROUND OF THE INVENTION

It is common practice to employ honeycomb sandwich panels for a wide range of uses in the construction of aircraft, space vehicles and other mechanisms and structures where light weight combined with strength is of importance. Such honeycomb panels are also used for sound absorption, and when so used the usual honeycomb core has a backing of thin sheet material applied to one end, and a sound pervious facing of suitable material applied to the other end thereof. The core acts as a resonant chamber between the facing and the backing wherein sound waves passing through the sound pervious facing are broken down into waves of different, and usually higher, frequencies, and wherein also some of the sonic energy is transformed into heat, which is transferred into the ambient atmosphere.

Since structural strength is an important factor in many sound suppressive honeycomb panels it is common practice to use for the sound pervious facing a light weight, perforated sheet of material which is similar to or compatible with the core material, even though it is well known that a facing of a material having a great multiplicity of random passages therethrough, such as Felt Metal, has a greater sound attenuating effect. The reason for using the perforated facing sheet in such instances is due to the fact that the Felt Metal is of relatively low tensile and edgewise compressive strength, so that a panel faced with it is incapable of withstanding the high stresses imposed by many structural applications.

PURPOSE OF THE INVENTION

It is a primary objective of the present invention to provide a material for the sound pervious facing of an acoustical honeycomb sandwich which will have substantial structural strength and pores of random size, shape and characteristics for wide band sound attenuation.

BRIEF DESCRIPTION OF THE DRAWINGS

The foregoing objectives and advantages of the invention will be apparent from the following description and the accompanying drawings, wherein.

DETAILED DESCRIPTION

Figure 4:
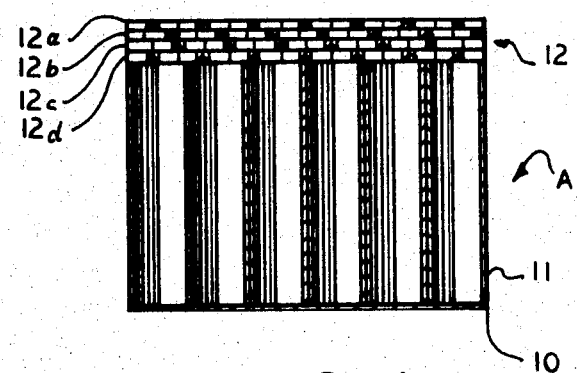
FIG. 4 is a fragmentary sectional view of a portion of an acoustical honeycomb sandwich panel employing as a sound pervious facing, multilayer porous material similar to that shown in FIGS. 1 and 2.
Figure 2:
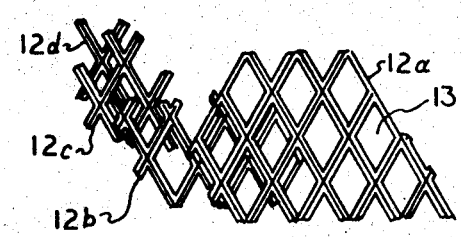
FIG. 2 is a fragmentary plan view in enlarged scale of a fragment of a multilayer porous facing embodying the invention.
Figure 1:
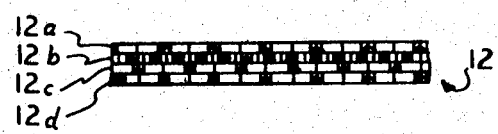
FIG. 1 is a sectional view taken along line 1—1 of FIG. 2.

Referring to the drawings in detail, a fragment of a sound absorptive panel A, FIG. 4, comprises a usual backing 10 of nonporous sheet material applied to one end of a conventional honeycomb core 11, and a multilayer, sound pervious facing 12, which embodies the present invention, applied to the other end. The facing material 12 shown in FIGS. 1 and 2 and 4 comprises a plurality of four layers 12a, 12b, 12c and 12d of flat, expanded metal mesh material. This well-known material is made by cutting rows of slits in staggered relation throughout the width of a sheet of metal and then expanding the sheet transversely of the length of the slits by applying laterally directed tensile forces to both edges of the sheet, thereby opening the slits to provide diamond-shaped holes throughout the slitted area. The expanded material is then rolled to flatten it. The four layers 12a–12d of such expanded metal mesh shown in FIGS. 1, 2 and 4 all have openings 13 of substantially equal size therein, and with the major axes of the openings in all sheets parallel. However, in order to produce multilayer facing material with the opening therein of different sizes and shapes, individual layers may be arranged with the major axes of the openings in the various layers of the assembly disposed at various selected angles to each other, and the various layers may be of different materials or have different types of openings therein.

The multiple layers of the facing assembly 12, arranged in random manner so that the openings of successive layers are not in register with each other, and in closely superposed relation, are integrally interconnected, for example, by diffusion bonding, brazing or resistance welding. The layers of the facing material 12 preferably are interconnected with each other at the same time the component parts of the panel A are interconnected as shown in FIG. 4. Even though a perforated or foraminous sheet material to be used for the various layers of a multilayer facing assembly has substantial tensile strength only along one axis of the openings in the sheet, as would be the case with the expanded metal sheets 12a–12d of FIG. 4, when all of the layers of the assembly are brazed or otherwise integrally interconnected as shown in FIG. 4, and as described previously herein, the successive layers brace and strengthen each other so that the multilayer assembly has substantial structural strength along both planar axes of the assembly, and even diagonally.

Figure 3:
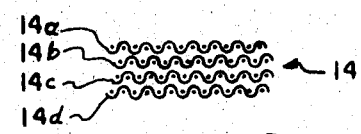
FIG. 3 is a sectional view of a modified form of the invention.

Various types of perforated or open mesh materials can be used to assemble a multilayer structural facing material for a honeycomb panel in accordance with the invention. For example, in FIG. 3 a multilayer facing 14 comprises a plurality of layers of woven wire mesh material 14a, 14b, 14c and 14d, assembled in random arrangement and in closely superposed relation. The superposed layers of the assembly 14 are integrally interconnected in a suitable manner as explained previously herein, and the assembly is then incorporated as the sound pervious facing of a sound absorptive honeycomb panel as described previously herein in connection with FIGS. 1, 2 and 4.

The passages or openings provided through the resultant multilayer facing assembly by the random positioning of the openings in the various layers thereof provided by the invention are capable of infinite variation by changing the sizes, shapes and types of the openings, and the direction of their major axes in the various layers employed, so that sound waves passing in and out through these passages into and out of the resonant chamber provided by the honeycomb core 11 and the backing sheet 10 are reflected, changed in frequency, and in part transformed from sonic energy into heat, which is transferred by radiation and conduction into the ambient atmosphere.

The multilayer facing provided by the invention has many of the superior sound attenuating features of the highly regarded metal felt facing material frequently employed where maximum available acoustical absorption is required, and additionally has substantial structural strength, so that a sound absorptive honeycomb panel made in accordance with the present invention may be incorporated as a structural element into an airplane or other mechanism or structure of which it is a part. Obviously the multilayers having higher strength in one direction may be oriented to provide desired directional properties.

The invention provides a multilayer integral facing for a sound absorptive honeycomb panel with extremely high capability for sound absorption, of substantial structural strength, and capable of infinite variation in the size, shape and tortuousness of the passages provided therethrough.

Having illustrated and described out invention, we now claim and desire to protect by Letters Patent:

1. A high-strength, multilayer face material for a sound absorptive panel of the type comprising a perforated face material spaced from a backing surface to provide a resonant chamber between the face material and the backing surface, said face material comprising:

a plurality of layers of expanded metal of the type wherein a plurality of rows of slits are cut in staggered relation throughout the width of a sheet of metal, and the sheet is then expanded transversely of the length of the slits by applying opposed, outwardly directed forces to the lateral edges of the sheet, thereby opening the slits to provide diamond-shaped holes throughout the slitted area, the layers being superposed in random arrangement with the diamond-shaped holes in each layer in haphazard, nonregistering relation with the diamond-shaped holes of all remaining layers of such plurality, and brazing-type metal integrally bonding together all contacting points of intersection of each of the layers of expanded metal with those of each other layer of the plurality in relatively superposed relation therewith, whereby a substantially integral facing is formed, with irregular size holes therein having irregular walls for high sound absorption and great tensile strength.

2. A multilayer face material as claimed in claim 1 wherein the contacting points of intersection of the superposed layers are integrally interconnected by diffusion bonding.

3. A multilayer face material as claimed in claim 1 wherein the major axes of the diamond-shaped holes of at least two of the layers are nonparallel.

* * * * *